(12) United States Patent
Bolt et al.

(10) Patent No.: US 8,269,728 B2
(45) Date of Patent: Sep. 18, 2012

(54) SYSTEM AND METHOD FOR MANAGING MEDIA DATA IN A PRESENTATION SYSTEM

(75) Inventors: Stephen Bolt, Kanata (CA); James Rempel, Calgary (CA); Paul A. Auger, Osgoode (CA)

(73) Assignee: SMART Technologies ULC (CA)

( * ) Notice: Subject to any disclaimer, the term of this patent is extended or adjusted under 35 U.S.C. 154(b) by 1058 days.

(21) Appl. No.: 11/759,808

(22) Filed: Jun. 7, 2007

(65) Prior Publication Data

US 2008/0303794 A1 Dec. 11, 2008

(51) Int. Cl.
*G06F 3/041* (2006.01)
(52) U.S. Cl. ..................... 345/173; 348/14.03
(58) Field of Classification Search .......... 345/173–183; 715/788; 725/80; 348/E7.081, E7.083, 14.03
See application file for complete search history.

(56) References Cited

U.S. PATENT DOCUMENTS

| | | | |
|---|---|---|---|
| 6,452,615 B1 | 9/2002 | Chiu et al. | |
| 6,501,463 B1* | 12/2002 | Dahley et al. | 345/173 |
| 6,518,960 B2* | 2/2003 | Omura et al. | 345/177 |
| 6,642,918 B2 | 11/2003 | Uchida et al. | |
| 6,803,906 B1 | 10/2004 | Morrison et al. | |
| 2002/0194596 A1 | 12/2002 | Srivastava | |
| 2003/0103075 A1* | 6/2003 | Rosselot | 345/717 |
| 2003/0223732 A1 | 12/2003 | Lin et al. | |
| 2004/0181622 A1 | 9/2004 | Kiser et al. | |
| 2005/0100312 A1* | 5/2005 | Commons et al. | 386/46 |
| 2006/0107294 A1* | 5/2006 | Rivlin et al. | 725/80 |
| 2006/0288370 A1 | 12/2006 | Rothschild | |
| 2007/0083825 A1* | 4/2007 | Chaudhri et al. | 715/788 |
| 2007/0171273 A1* | 7/2007 | Saleh et al. | 348/14.08 |

OTHER PUBLICATIONS

Office Action for People's Republic of China Patent Application No. 200710198818.9 with a mailing date of Mar. 24, 2011.

* cited by examiner

*Primary Examiner* — Kevin M Nguyen
(74) *Attorney, Agent, or Firm* — Katten Muchin Rosenman LLP

(57) ABSTRACT

A media integration device associated with a touch system including a touch screen, comprises a media control module operative to receive media information from a plurality of devices and generate media data associated with each of the plurality of devices. The media control module selects one device from the plurality of devices for displaying media data associated with the one device on the touch screen. A program module is operatively coupled to the media control device and adapted to generate a graphical user interface including a first display on the touch screen for operationally controlling the selected one device from the touch screen.

42 Claims, 15 Drawing Sheets

SYSTEM AND METHOD FOR MANAGING MEDIA DATA IN A PRESENTATION SYSTEM

FIELD OF THE INVENTION

The present invention relates generally to managing both analog and digital information that is received from one or more media devices, and in particular, to a system and method for facilitating the communication and control of such information and devices in an audio and visual presentation system.

BACKGROUND OF THE INVENTION

Touch systems are well known in the art and typically include a touch screen having a touch surface on which contacts are made using a pointer. Pointer contacts with the touch surface are detected and are used to generate corresponding output pointer position data representing areas of the touch surface where the pointer contacts are made. There are basically two general types of touch systems available and they can be broadly classified as "active" touch systems and "passive" touch systems.

Active touch systems allow a user to generate pointer position data by contacting the touch surface with a special pointer that usually requires some form of on-board power source, typically batteries. The special pointer emits signals such as infrared light, visible light, ultrasonic frequencies, electromagnetic frequencies, etc. that activate the touch surface.

Passive touch systems allow a user to generate pointer position data by contacting the touch surface with a passive pointer and do not require the use of special pointers in order to activate the touch surface. A passive pointer can be a finger, a cylinder of some material, or any other suitable object that can be used to contact some predetermined area of interest on the touch surface. Since special active pointers are not necessary in passive touch systems, battery power levels and/or pointer damage, theft, or pointer misplacement are of no concern to users.

Typically, touch screens may be used in conjunction with computers, where computer-generated images are displayed on the touch screen. A user may then contact the touch screen in order to, for example, create markings or writings which appear superimposed over the displayed computer-generated images. Alternatively, a user may wish to select an area of a computer-generated image displayed on the touch screen, where based on the selected region or area, an application program running on the computer executes one or more functions (e.g., generating another graphical image). In addition to computer generated images, a myriad of other devices are capable of generating still and/or moving images (e.g., JPEG files, analog and digital video formats, etc.).

Techniques for facilitating communication, control, and management of signals and data between different audio/visual (AV) devices have been considered. U.S. Patent Application Publication No. 2002/0194596 to Srivastana et al. discloses an audio-video platform (AVP) that functions as a master controller to interconnect other AV devices and provide unified control of all the AV devices connected to it. The AVP receives all control signals from users and controls slave mode AV devices via an IEEE-1394 bus and master mode AV set-top boxes (STBs) by using an infrared (IR) blaster, having a command set equivalent to the infrared remote control of the master-mode AV device. The AVP also controls legacy devices via the IR blaster. The AVP includes an on-screen-display (OSD) and provides a unified graphic user interface (GUI) for the connected AV devices. The AVP can transfer compressed AV signals for processing, display them in a common format, and make it possible to display video from all AV devices.

U.S. Patent Application Publication No. 2003/0223732 to Lin et al. discloses a system for interactive video playback, where the system includes a store for holding a set of video streams and an input device for obtaining a set of action inputs. The system also includes a video processor that generates the interactive video playback by switching among the video streams in response to the action inputs.

U.S. Patent Application Publication No. 2004/0181622 to Kiser et al. discloses a system for remotely controlling multiple appliances with a configurable interface for a user. A transceiver device, preferably having an infra-red (IR) receiver and transmitters, samples and stores IR remote control signals from a remote control device associated with an appliance. The transceiver device communicates with a computer having a user interface program. The user selects an interface and associates an input action with a sampled IR remote signal so that by performing the input action, the computer causes the transceiver device to transmit the sampled signal to the appliance. The system provides the user with a master remote control system capable of controlling multiple appliances from a variable, configurable software interface.

U.S. Patent Application Publication No. 2006/0288370 to Rothschild discloses a system and method for controlling an operation of at least one electronic device or appliance. The system and method obviates the need for a user of a plurality of electronic devices, e.g., a television, digital video disc (DVD) player, VCR, etc., to keep track of and maintain a corresponding plurality of remote control devices. The system and method provide the user with a graphic representation of the remote control device for each electronic appliance on a display controllable by a single, easy-to-use, intuitive transmitter. The graphic representations and associated control codes for the plurality of electronic appliances are downloadable via a global computer network, e.g., the Internet. A user can access all of the functions of each of the plurality of electronic appliances with a single remote transmitter without having to manually program the transmitter for each electronic appliance.

U.S. Pat. No. 6,452,615 to Chiu et al. discloses media input streams that are retrieved by a notetaking device and referenced for playback. The media streams are from microphones, video cameras, and media players present during a notetaking session. Facilities provided by the notetaking device allow a user to capture stills from the media streams, make annotations, and reference important events that occur during a notetaking session. Thumbnails, snaps, and backgrounds may be created from the input media streams and are used to reference into the media streams which are stored for later playback. A channel changer allows a user to switch between the various media streams during either notetaking or playback. A timeline is automatically generated that references important events, including slide changes, presented during a notetaking session.

U.S. Pat. No. 6,642,918 to Uchida et al. discloses controlling a presentation device coupled to a presentation system using a user interface generated by a computing system. The user interface includes one or more regions which vary in size based on whether the user interface is being displayed. The user interface accepts input from a pointing device to control the presentation device.

Although the above references allegedly propose various techniques for receiving and controlling various data streams and input from different media sources, improvements are desired. It is therefore at least one object of the present invention to provide a novel system and method for controlling a myriad of media devices capable of generating both digital and/or analog signals within a presentation system such as a touch system.

SUMMARY OF THE INVENTION

According to one aspect there is provided a media integration device associated with a touch system including a touch screen. The device comprises a media control module operative to receive media information from a plurality of devices and generates media data associated with each of the plurality of devices. The media control module selects one device from of the plurality of devices for displaying the media data associated with the selected one device on the touch screen. A program module operatively coupled to the media control module generates a graphical user interface having a first display on the touch screen for operationally controlling the selected one device from the touch screen.

According to another aspect there is provided a method of controlling a plurality of devices associated with a touch system using a touch screen. The method comprises coupling media information from a plurality of devices to the touch system, displaying representations of the plurality of coupled devices on the touch screen, and displaying at least one activation button on the touch screen for controlling one or more operations associated with each of the plurality of devices. One of the plurality of coupled devices is selected using the touch screen and media data associated with the selected device is displayed on the touch screen. The displayed at least one activation button is activated for controlling the one or more operations associated with the selected device.

According to yet another aspect there is provided an interactive graphical user interface adapted for use within a touch system including a touch screen. The graphical user interface comprises a first selectable display region operable to display a plurality of media devices coupled to the touch system, where the first selective display region enables a media device to be selected from the displayed plurality of media devices. A second selectable display region is configurable to display user accessible tools that correspond to the media device selected from the displayed plurality of media devices. The first and second selectable display regions emanate from a common origin on the touch screen, whereby the first selectable region extends in a first direction and the second selectable region extending in a second direction.

Further, according to another aspect, a method of controlling a plurality of devices associated with a touch system using a touch screen is provided. The method comprises displaying a first region on the touch screen that includes a selectable plurality of media devices that are coupled to the touch system. A second region is displayed on the touch screen that includes selectable user accessible tools that correspond to a media device selected from the displayed plurality of media devices. The first and second regions emanate from a common origin on the touch screen, whereby the first region extends in a first direction and the second region extends in a second direction.

BRIEF DESCRIPTION OF THE DRAWINGS

Embodiments will now be described more fully with reference to the accompanying drawings in which.

DETAILED DESCRIPTION OF THE PREFERRED EMBODIMENT

In the following description, an embodiment of a system and method for managing the communication and control of analog and/or digital information (e.g., analog A/V signals, digital A/V data, digital image files, MP3 files, etc.) in a media presentation environment such as a touch screen system is provided.

Figure 1:
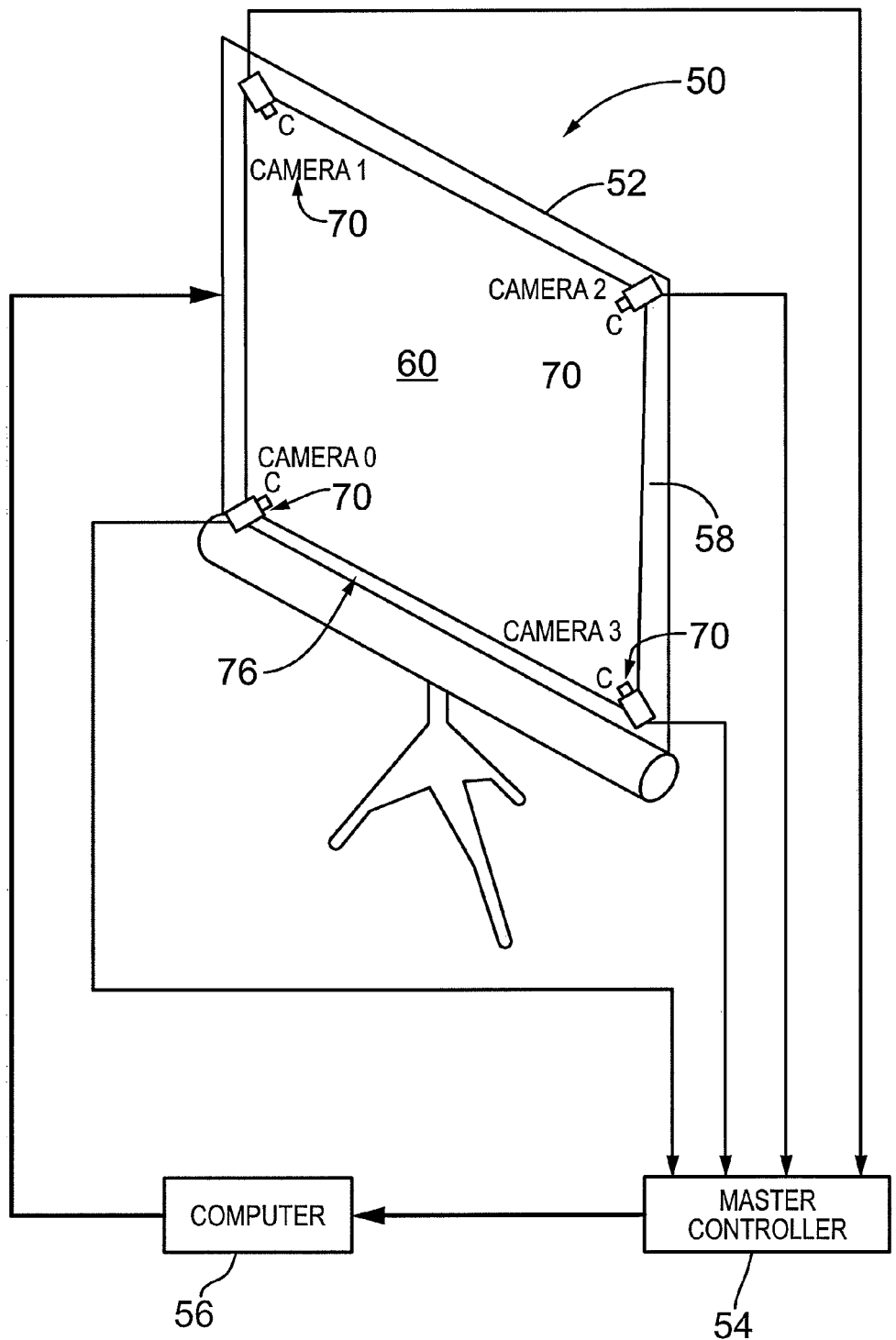
FIG. 1 is a schematic diagram of a camera-based touch system.

Turning now to FIG. 1, a camera-based touch system 50 is provided, as disclosed in U.S. Pat. No. 6,803,906 to Morrison et al. and assigned to the assignee of the subject application, the content of which is incorporated by reference herein in its entirety. Touch system 50 in this embodiment includes a touch screen 52 coupled to a digital signal processor (DSP) based master controller 54. Master controller 54 is also coupled to a computer 56. Computer 56 executes one or more application programs and provides one or more computer-generated image outputs that are displayed on the touch screen 52 and processed by the master controller 54. The touch screen 52, master controller 54 and computer 56 form a closed-loop so that pointer contacts with the touch screen 52 can be recorded as writing or drawing or used to control execution of an application program executed by the computer 56.

Figure 2:
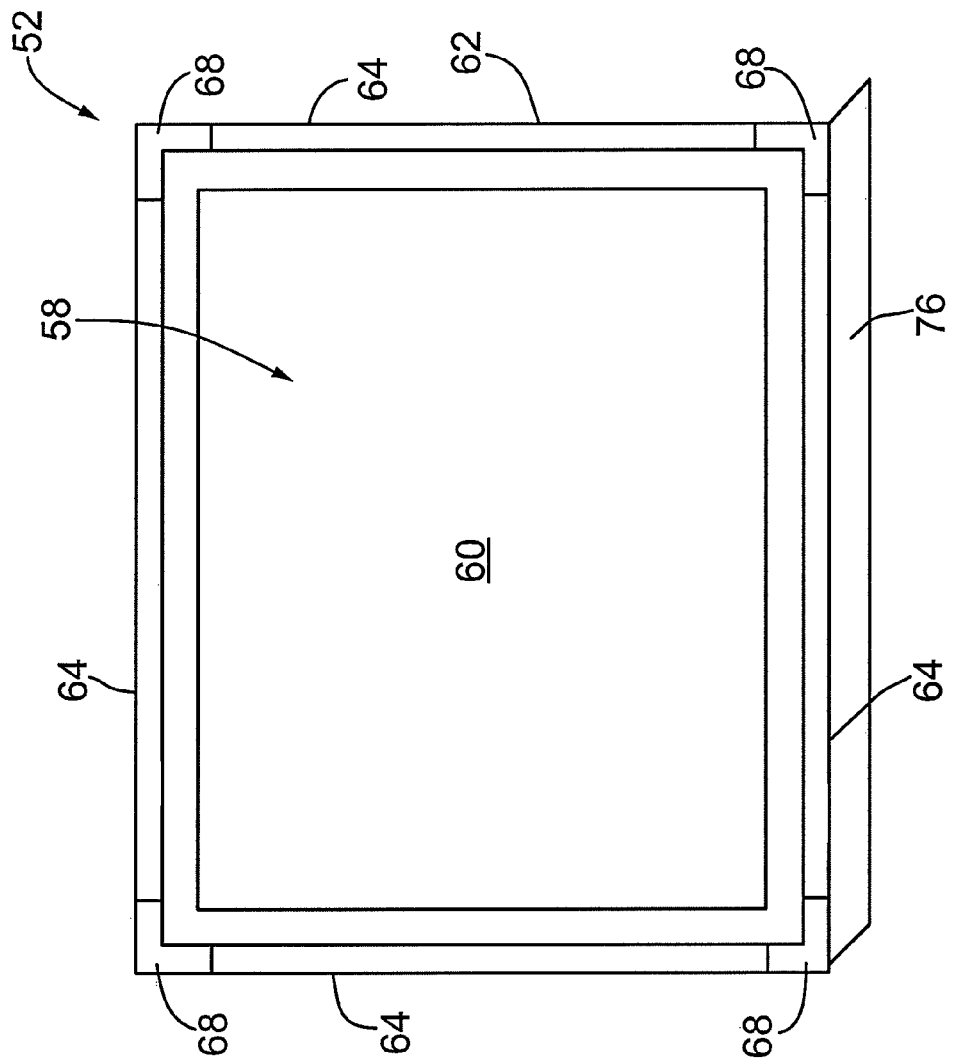
FIG. 2 is a front elevation view of a touch screen forming part of the touch system of FIG. 1.

As shown in FIG. 2, touch screen 52 includes a high-resolution display device such as a plasma display 58, the front surface of which defines a touch surface 60. The touch surface 60 is bordered by an illuminated bezel or frame 62 coupled to the display device. Illuminated bezel 62 includes elongate side frame assemblies 64 that are coupled to the sides of the plasma display 58. Each side frame assembly 64 accommodates a generally continuous illumination source 66 (not shown). The ends of the side frame assemblies 64 are joined by corner pieces 68 that house DSP-based CMOS digital cameras 70 (not shown). Each digital camera is mounted within its respective corner piece 68 so that its field of view encompasses and looks obliquely across the entire touch surface 60 (i.e. at a generally flat angle relative to the touch surface). A tool tray 76 is positioned adjacent the bottom edge of the touch surface 60 and accommodates a plurality of different color pointers in the form of pen tools used to contact the touch surface 60.

The general operation of the touch system 50 will now be described. Each digital camera 70 acquires images of the touch surface 60 within the field of view of its associated image sensor and lens assembly at the selected frame rate and processes the images to determine if a pointer is in the acquired images. If a pointer is in the acquired images, the images are further processed to determine characteristics of the pointer contacting or hovering above the touch surface 60. Pointer characteristics are then converted into pointer information packets (PIPs) and the PIPs are queued for transmission to the master controller 54.

The master controller 54 polls the digital cameras 70 (FIG. 1) at a set frequency (in this embodiment 70 times per second) for PIPs and triangulates pointer characteristics in the PIPs to determine pointer position data. The master controller 54 in turn transmits pointer position data and/or status information to the computer 56. In this manner, the pointer position data transmitted to the computer 56 can be recorded as writing or drawing or can be used to control execution of application programs executed by the computer 56. The computer 56 also updates the display output conveyed to the display device 58 so that information projected onto the touch surface 60 reflects the pointer activity.

The described touch system incorporates one example of detecting position data associated with a pointer within a presentation environment such as a touch system. Thus, many other current and future developed techniques may be used in the detection of point locations on a touch screen or any other type of display mechanism.

Figure 3:
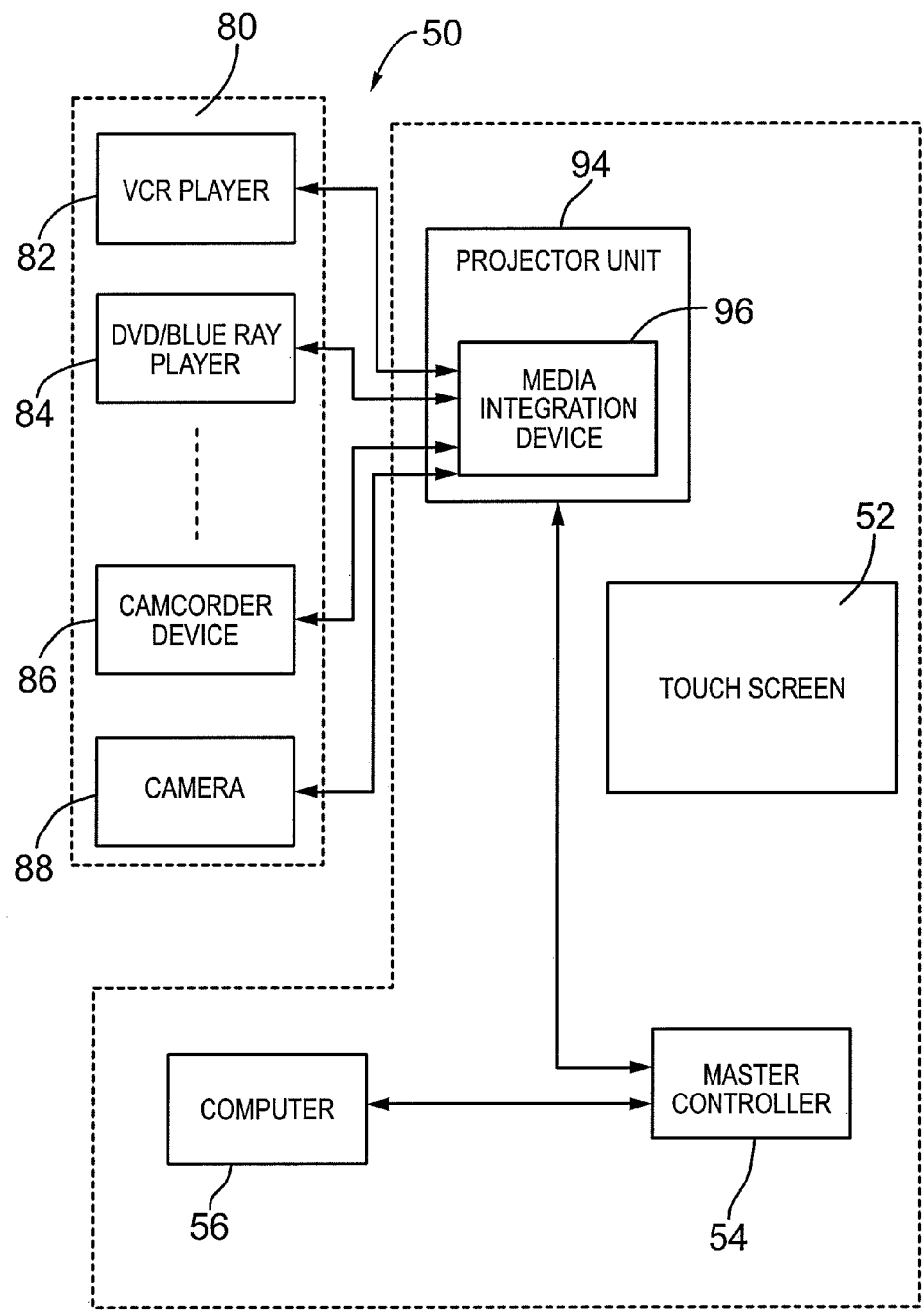
FIG. 3 is a block diagram of an alternative touch system incorporating a media integration device.

Turning now to FIG. 3, a block diagram of an alternative embodiment of a touch system 50 incorporating a media integration device 96 is shown. Touch system 50 includes a projector device 94, a media integration device 96, a touch screen 52, a master controller 54, a computer 56 (optional), and a media source 80.

The media source 80 includes a plurality of media devices 82-88 capable of providing media information such as visual and audio output signals to the media integration device 96. For example, the media source 80 may include a VCR player 82, a DVD or Blue Ray player 84, a camcorder device 86, and a digital camera 88. A range of other devices (not shown) may also be coupled to the media integration device 96. For example, a digital scanner, a network based video stream, and an external media data store may be included in media source 80. The output signals generated from the plurality of media devices may include both analog and digital video (e.g., DVD output, VCR output) signal formats, still or moving images, and generally, any visual and/or audio data that is utilized for presentation purposes in touch system 50.

As previously described, media information associated with media devices 82-88 may include any format and combination of audio and visual signal that is either in analog or digital form. Media information that is received by the media integration device 96 is generally processed and presented to the touch screen 52 or other display system as media data, whereby analog signals received from the media devices 82-88 by the media integration device 96 are mostly digitized. However, there may be some instances in which a signal received by the media integration device 96 is maintained in analog form (e.g., analog audio) for playback purposes.

Media integration device 96 is adapted to receive various signal formats from media source 80, if necessary process the received signal formats (e.g., digital to analog conversion, video encoding, MPEG-2 decoding, MPEG-4 decoding, etc.), and couple the processed output of a selected media device from within media source 80 to the projector unit 94 for display on touch screen 52. Media integration device 96 may also execute one or more programs for controlling the operation (e.g., PLAY, STOP, PAUSE, etc.) of any selected media device within media source 80. From within media integration device 96, other programming such as image capture capabilities on touch screen 52, annotation generation on the captured images, and the option of saving annotated images to one or more storage media may also, among other features, be provided.

In operation, media integration device 96 communicates with the media devices 82-88 of media source 80, projector unit 94, and master controller 54. For example, via media integration device 96, the output from VCR device 82 is selected, digitized, and sent to projector unit 94 for display on touch screen 52. In another example, media integration device 96 may run an annotation program, whereby the master controller 54 provides this program with position information corresponding to the location of a pointer device (not shown) used to generate markings or annotations over a captured image displayed on the touch screen 52.

As described above, media integration device 96 may include one or more hardware components and software programming that is loaded onto the media integration device 96 as firmware. Thus, media integration device 96 may include a system-on-a-chip (SOC) architecture, where a microprocessor, digital signal processors, interfacing, memory devices, and other components may be integrated within either a single device or multiple devices operating in cooperation. Software programming may be loaded onto on-chip ROM (read-only) memory as firmware. For example, the SOC architecture may be implemented as a full-custom fabricated chip or using a programmable device such as a Field Gate Programmable Array (FPGA) device.

Figure 4A:
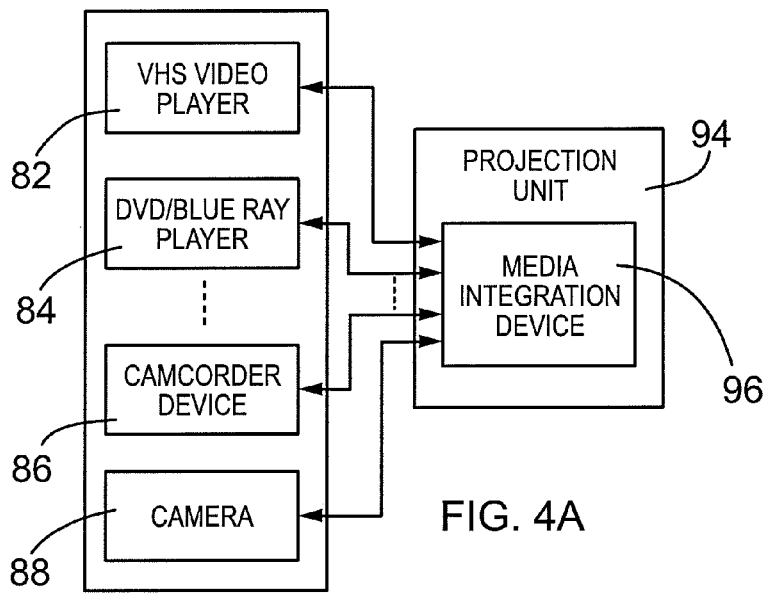
FIGS. 4a and 4b are block diagrams illustrating communications between the media integration device and a media source.
Figure 4B:
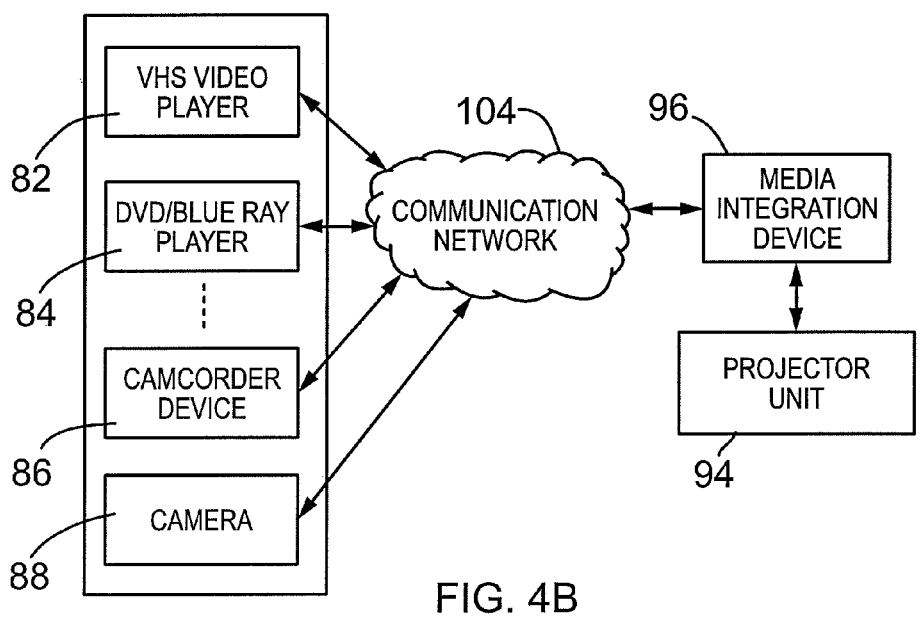

FIGS. 4a and 4b are block diagrams illustrating communications between the media integration device 96 and the various media devices 82-88 of media source 80. Turning now to FIG. 4a, media integration device 94 may be located within the housing (not shown) of the projector unit 94 and coupled to media source 80 using wired (e.g., twisted pair cable, coaxial cable, ribbon cable, etc.) and/or wireless (e.g., infrared, RF radio, visible light transmission, microware links, etc.) communication techniques. The communications media (i.e., wireless or wired) and corresponding communications protocols for exchanging data between the media devices 82-88 of media source 80 and media integration device 96 may vary depending on the type of media device, the range or distance between the location of the media device and the media integration device 96, and the bandwidth requirements for exchanging information or data between the media devices and the media integration device 96.

FIG. 4B illustrates an alternative embodiment, whereby the media integration device 96 receives media information from each of the media devices 82-88 over a communication network 104. In such an embodiment, the media devices 82-88 may be remotely located with respect to the media integration device 96. Furthermore, the media integration device 96 may be located outside the projector unit 94 housing as a separate device that is communicatively coupled (e.g., directly or networked) to projector unit 94. Alternatively, media integration device 96 may be incorporated within another component of touch system 50 (FIG. 1), such as master controller 54 (FIG. 1), computer 56 (FIG. 1), or touch screen 52 (FIG. 1).

Figure 5:
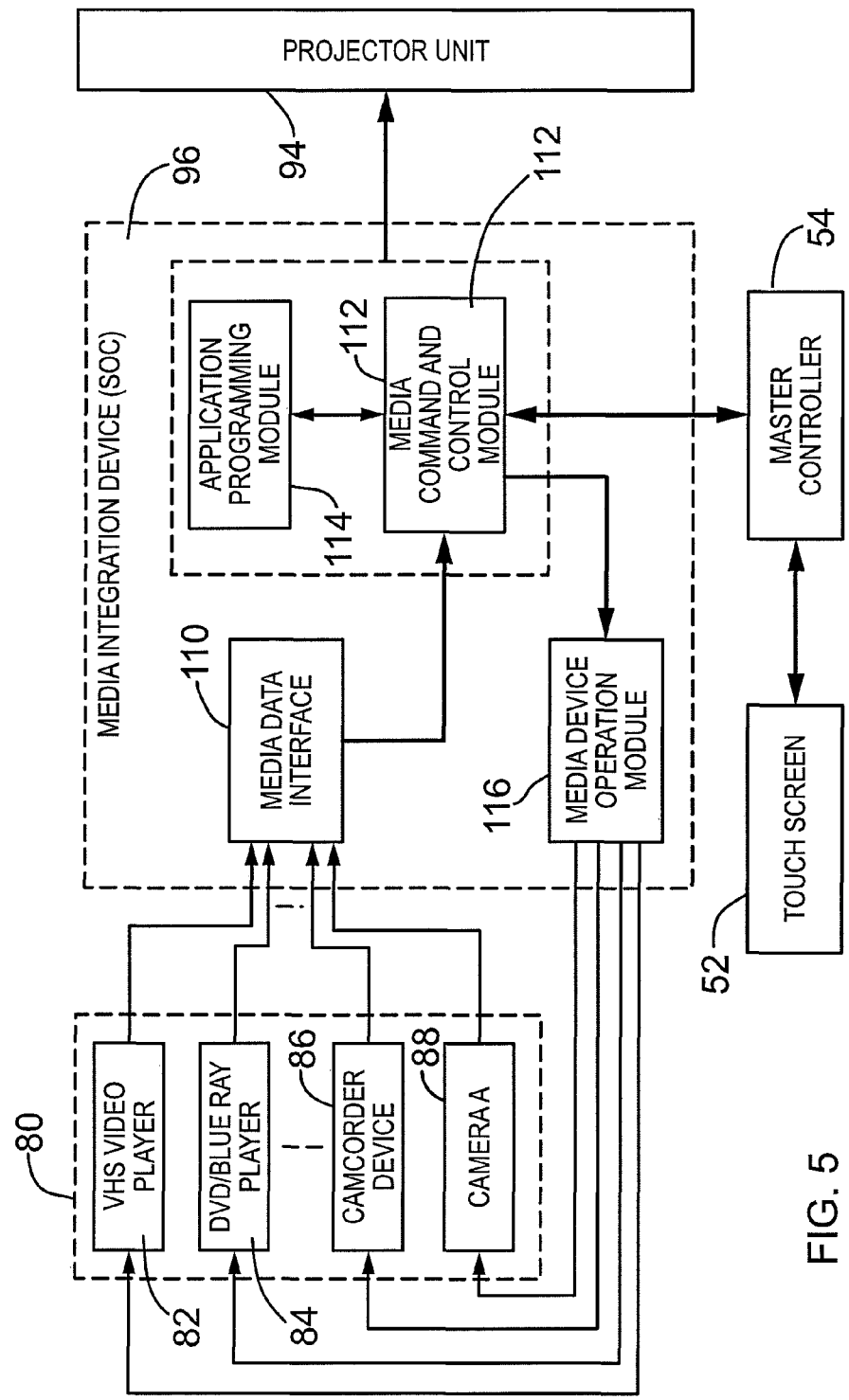
FIG. 5 is a block diagram of the media integration device.

Turning now to FIG. 5, a block diagram of media integration device 96 is provided. Media integration device 96 may include a media data interface 110, a media command and control module 112, an application programming module 114, and a media device operation module 116.

As previously described, media source 80 includes a plurality of media devices 82-88 capable of providing visual and audio output signals to the media data interface 110 component of media integration device 96. Media data interface 110 is configured to receive and process the different signal formats (e.g., analog video; digital video; image files such as JPEG, PDF, GIF, TIFF, BMP, PNG files, and RAW; audio files and signals; etc.) that are received from the various media devices. The processing carried out by interface 110 may include digitizing analog signals that are received from analog media devices such as VCR player 82 and processing digitized signals for compliance with the input signal requirements of the projector unit 94. For example, an MP3 player may be coupled to the media command and control module 112 via interface 110, whereby audio signals from the MP3 player are coupled from the media command and control module 112 to an audio playback device (e.g., soundcard, speakers, etc.). In addition to digital audio signal formats, interface 110 may include signal processing capabilities that also enables analog audio signals (mono/stereo) to be digitized and reformatted as audio files (e.g., MP3, WAVE audio file format, etc.) for playback on, for example, audio speakers associated with the touch screen 52. It will be appreciated that audio speakers may be integrated into the frame assembly 64 (FIG. 2) or other component of the touch screen 52, or form part of a separate external sound system (e.g., amplifier, mixer, speakers, etc.) coupled to the media integration device 96 and touch screen 52.

The media command and control module 112 receives digitized signals received from the media data interface 110 and selectively forwards one of the digitized signals associated with one of the media devices 82-88 to the projector unit 94 for display on touch screen 52 (FIG. 1). As will be described in later paragraphs, the process of selecting which media device output to display on the touch screen 52 is carried out through a series of interactive graphical user interface (GUI) screens that are generated by the media integration device 96 and displayed on touch surface 60 (FIG. 1). Through these generated GUI screens, a user is able to operationally control the selected media device whose output is displayed on the touch screen 52. For example, a user of the touch system is able to control the STOP, PLAY, REWIND, PAUSE, and FAST-FORWARD operations of any one of the media devices 82-88 that is coupled to and selected for display on the touch screen 52. Using the GUI screens, a user may also access a set of annotation tools for applying markings and annotations (e.g., using a pointer device) to the output of a selected media device that is displayed on the touch screen 52.

Firmware for executing software programming associated with these GUI screens and other features is stored and managed within the application program module 114. In operation, the firmware associated with the GUI screens is loaded from application program module 114 into media command and control module 112, where a processing device such as a microprocessor (not shown) executes the loaded firmware.

Media device operation module 116 provides output interfacing by generating the necessary signals for controlling media devices 82-88. For example, media operation module 116 may generate a particular remote control code corresponding to each selected operation (e.g., PAUSE, PLAY, STOP, etc.) associated with a particular media device (e.g., DVD player 84) selected for display on the touch screen 52. The media command and control module 112 is communicatively coupled to the media device operation module 116 and may provide the operation module 116 with data identifying, for example, the selected media device type (e.g., device make/model no.) and the operation (e.g., PLAY, STOP, etc.) activated from the displayed GUI on the touch screen 52 (FIG. 1). Based on the activated operation and the selected media device type, the operation module 116 sends the necessary signaling for controlling the selected media device. It will be appreciated that although media data interface 110, media command and control module 112, application programming module 114, and media device control module 116 form individual modules within the media integration device 96, these modules and their respective functionalities may be incorporated within a single module.

Figure 6:
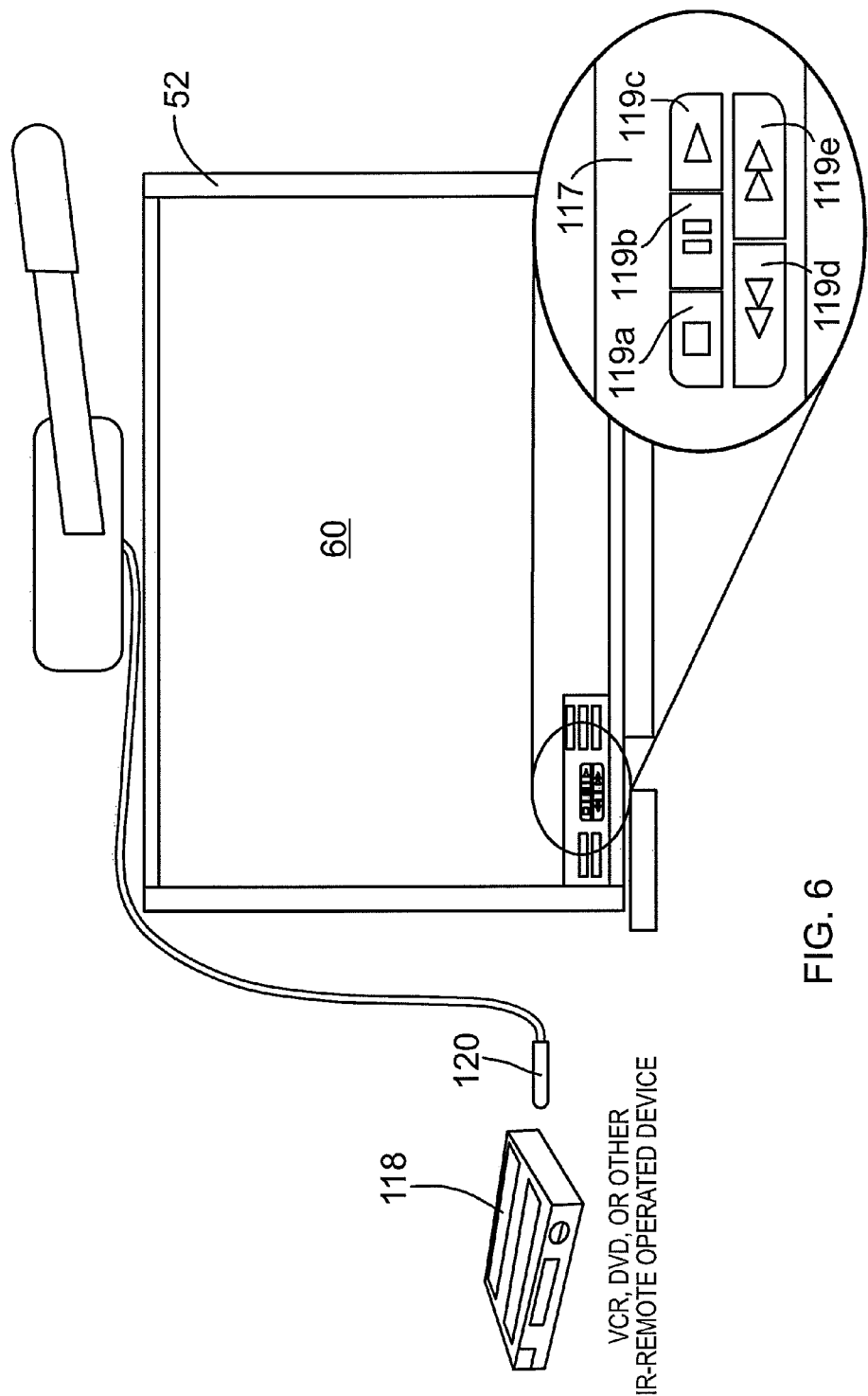
FIG. 6 is a graphical user interface (GUI) screen for operationally controlling media devices associated with the touch system.

An example of a displayed GUI screen is shown in FIG. 6, where a device operation interactive display 117 is provided. The device operation interactive display 117 enables a user to control a selected media device 118 by activating buttons 119a-119e displayed on the touch screen 52. For example, in operation, by activating the STOP button 119a using a pointer or other device to contact touch screen 60, the master controller 54 (FIG. 5) calculates and sends the touch screen coordinates of the contact point to the media command and control module 112 (FIG. 5). Based on the calculated coordinates, the media command and control module 112 detects that the STOP button of display 118 has been activated. The media command and control module 112 (FIG. 5) then communicates with media operation module 116 (FIG. 5), which based on the make/model of media device 118 and the button activated (i.e., STOP), generates the necessary output control signal for stopping media device 118. The generated output signal may be sent from the touch screen 52 to the media device 118 using a transmitter device such as an infrared (IR) remote control device 120.

Figure 7:
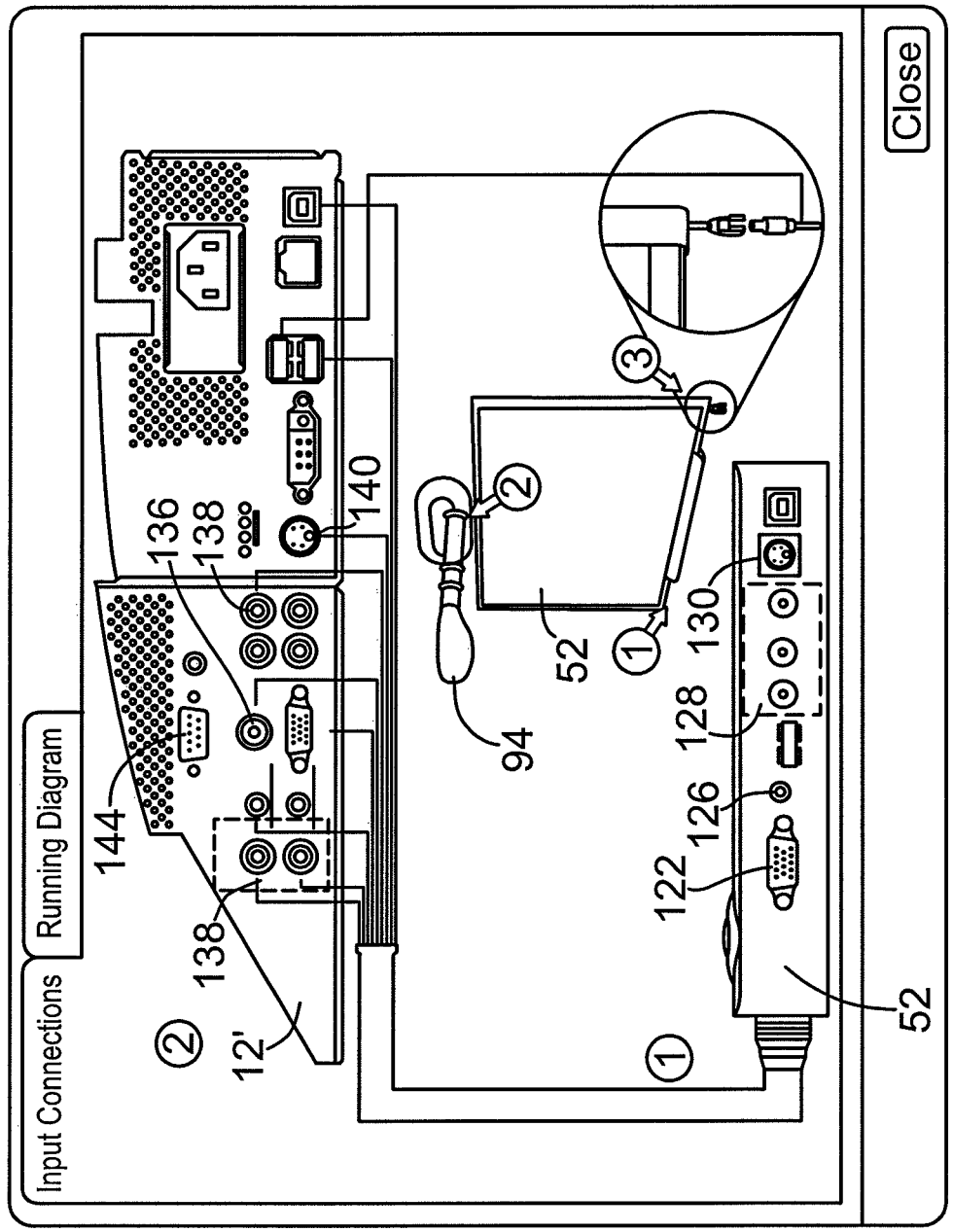
FIG. 7 shows an example of electrical connectivity between a projector unit base and a connection panel located adjacent the touch screen.

Turning now to FIG. 7, an example of electrical connectivity between the base 121 of projector unit 94 and an extended connection panel 122 used for coupling the various media device outputs to the media integration device 96 (within base 121) is provided. As illustrated, VGA input 124, audio input (stereo) 126, AUDIO IN L/R and corresponding composite video 128, and S-Video connection 130 on extended panel 122 connect to VGA input 134, audio input (stereo) 136, AUDIO IN L/R and corresponding composite video 138, and S-Video connection 140 on base 121, respectively. It will be appreciated that the illustrated electrical connectivity may be extended to include many additional and/or different types of connectors. Also, the connectivity between the base 121 and connection panel 122 may be established via wireless means such as the BLUE TOOTH protocol and standard. An RS232 connection 144 may be used to facilitate communication between media integration device 96 (housed within base 121), in particular media device operation module 116, and remote control device 120.

Figure 8A:
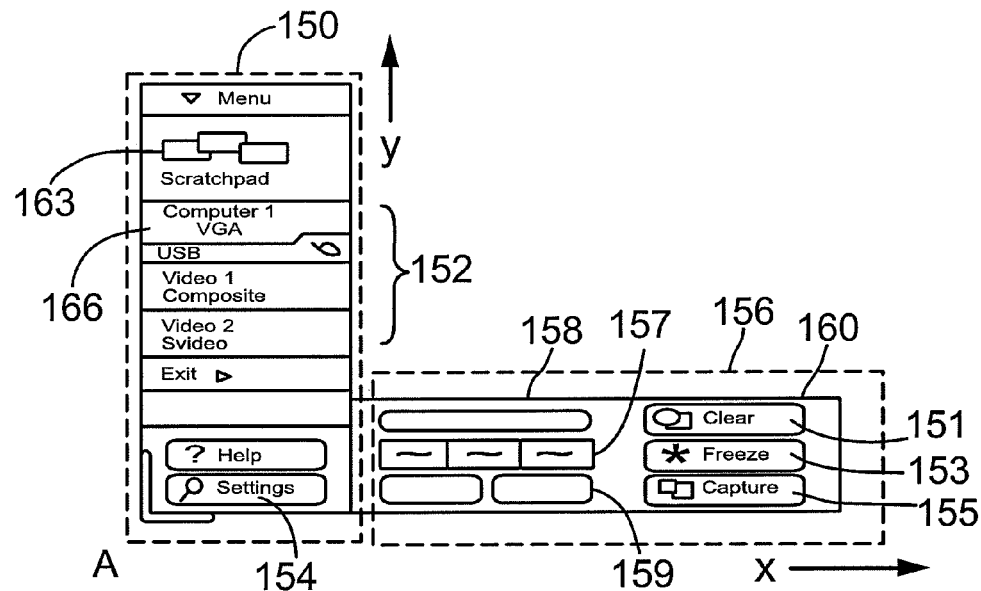
FIGS. 8A-8D is an interactive GUI display screen associated with the touch system.
Figure 8B:
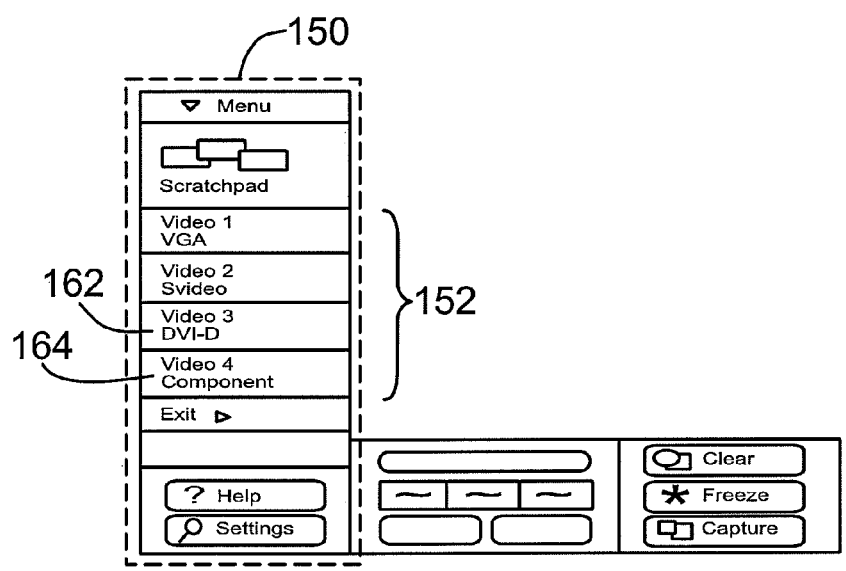

FIGS. 8A-8D are examples of interactive graphical user interfaces (GUI) generated by the media command and control module 112 (FIG. 5) in association with touch system 50 (FIG. 1). Turning now to FIG. 8A, display region 150 forming part of generated image on the touch screen surface 60 is configured to display the media devices 152 that are coupled to the touch system, where a desired media device (e.g., Video 1) may be selected from the displayed media devices. Display region 150 also includes a settings button 154 that provides, among other features, the ability to configure the touch system by adding/removing various media devices to/from the touch system, and selecting media data/information input type (e.g., VGA, S-Video, etc.) associated with the various media devices. For example, FIG. 8B shows a GUI display where additional media devices 162 (Video 3) and 164 (Video 4) have been added, and media device 166 (Computer 1—FIG. 8A) has been removed from display region 150. Once a media device is added, its input type may also be enabled. Display region 150 also includes a selectable image program 163 (e.g., SCRATCHPAD feature) that allows the capture, saving, and sharing of drawings created on the touch screen 52 (FIG. 1).

Figure 9:
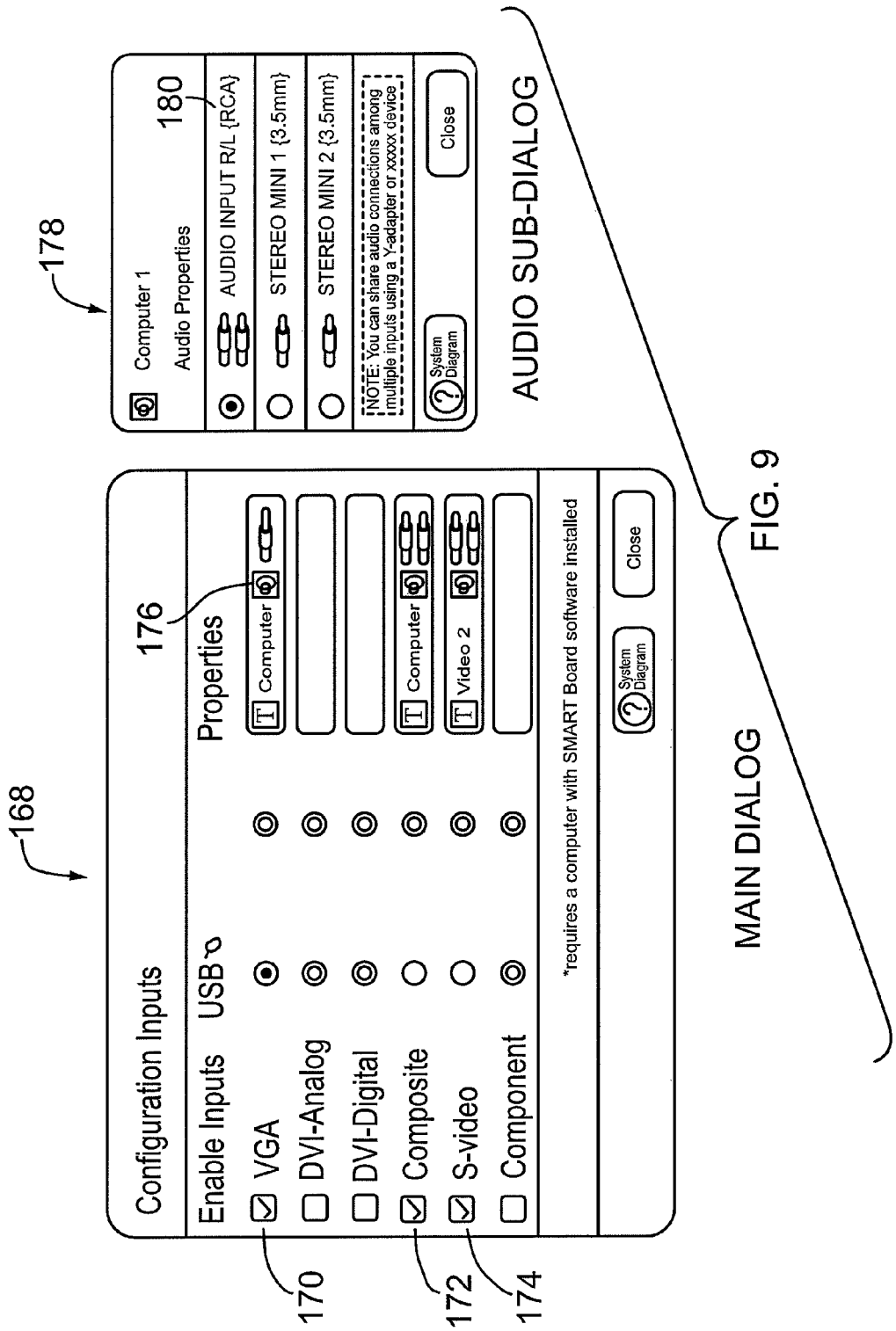
FIG. 9 shows an example of a configuration screen associated with the input types for each of the media devices coupled to the touch system.

An example of a configuration screen 168 associated with each of the input types for media devices 152 is provided in FIG. 9. As depicted, a VGA input 170, a composite video input 172, and an S-video 174 input are enabled for media devices such as Computer 1, Video 1, and Video 2, respectively. Also, by selecting an audio properties icon 176 associated with Computer 1, an audio sub-screen 178 is activated for configuring the audio properties. In the current example, an RCA audio input 180 is selected.

Figure 8C:
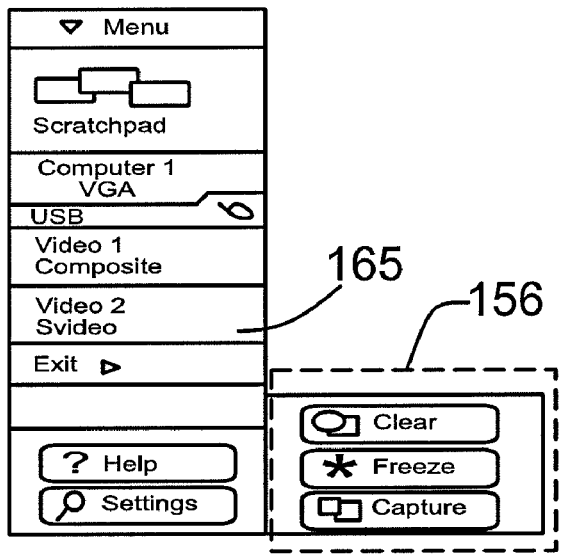
Figure 8D:
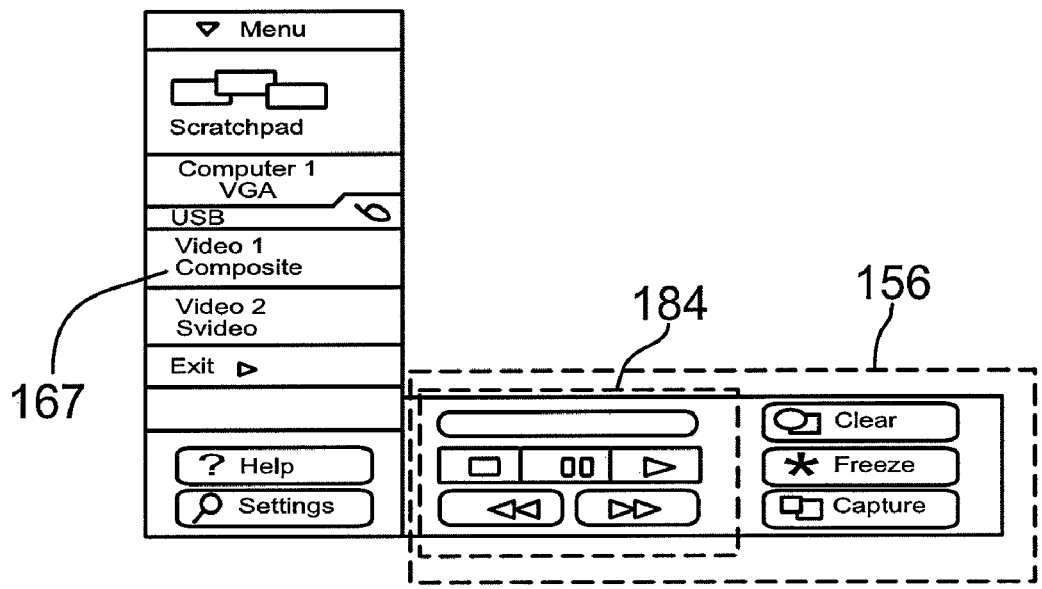

In FIG. 8A, display region 156 also forming part of the generated image on the touch surface 60 is configurable to display user accessible tools such as annotation tools 158 and image selection tools 160. As shown in FIG. 8D, other user assessable tools such as media device operation interactive display 184 may also be included in display region 156. On the other hand, the GUI and underlying programs may be configured to provide a designated set of user accessible tools 158 based on the media device selected from display region 150. For example, as illustrated in FIG. 8C, by selecting media device 165 (Video 2), the option of using the annotation tools 158 has been removed from display region 156. According to another example, as illustrated in FIG. 8D, by selecting media device 167 (Video 1), the annotation tools 158 option has been removed but the media device operation interactive display 184 has been added to display region 156.

Annotation tools 158 enable a user to draw and make annotations over an image that is displayed on touch surface 60 (FIG. 1), whereby the displayed image corresponds to the output of a media device selected from the media devices listed in display region 150. As previously described, the displayed annotation tools (GUI) 158 and the application software that executes the annotation program may reside and run from within the media integration device 96 (FIG. 5). The annotation tools 158 may include selectable line drawing buttons 157 that provide annotations and drawings having different line thicknesses, and line color selection buttons 159 for changing the color of the annotations.

The image selection tools 160 enable a user to manipulate an image by capturing an image from a selected media source, freezing a particular frame of video images that are generated from a selected media source, and provide the option of clearing a generated image that is displayed on the touch surface 60 (FIG. 1). These manipulation tools are provided by clear button 151, freeze button 153, and capture button 155. Although not illustrated, image selection tools 160 may host a variety of other image manipulation tools such as brightness and contrast control, cropping, and histogram functions. As with annotation tools (GUI) 158, the image selection tools (GUI) 160 and the application software that executes the image selection program may reside and run from within the media integration device 96 (FIG. 5). As previously described in relation to FIG. 8, the media device operation interactive display 184 may also be executed from within the media integration device 96 (FIG. 5) along with image program 163.

Display regions 150 and 156 emanate from a common origin on the touch screen, as indicated at A, where display region 150 extends in a first direction and display region 156 extends in a second direction. This provides a user-friendly display that facilitates the navigation of the GUI display based on the user accessible tools 158, 160, 184 and the listed media devices 152 being separated along two different axes, as indicated by x and y. In the current exemplary embodiment, as illustrated, the two x and y axes are substantially orthogonal. With such a look-and-feel, the user may identify the various tools for a particular selected media device along one axis or direction, while identifying a list of available media devices along another axis or direction. As tools and media devices are added, the axes are extended to accommodate the additions.

Figure 10:
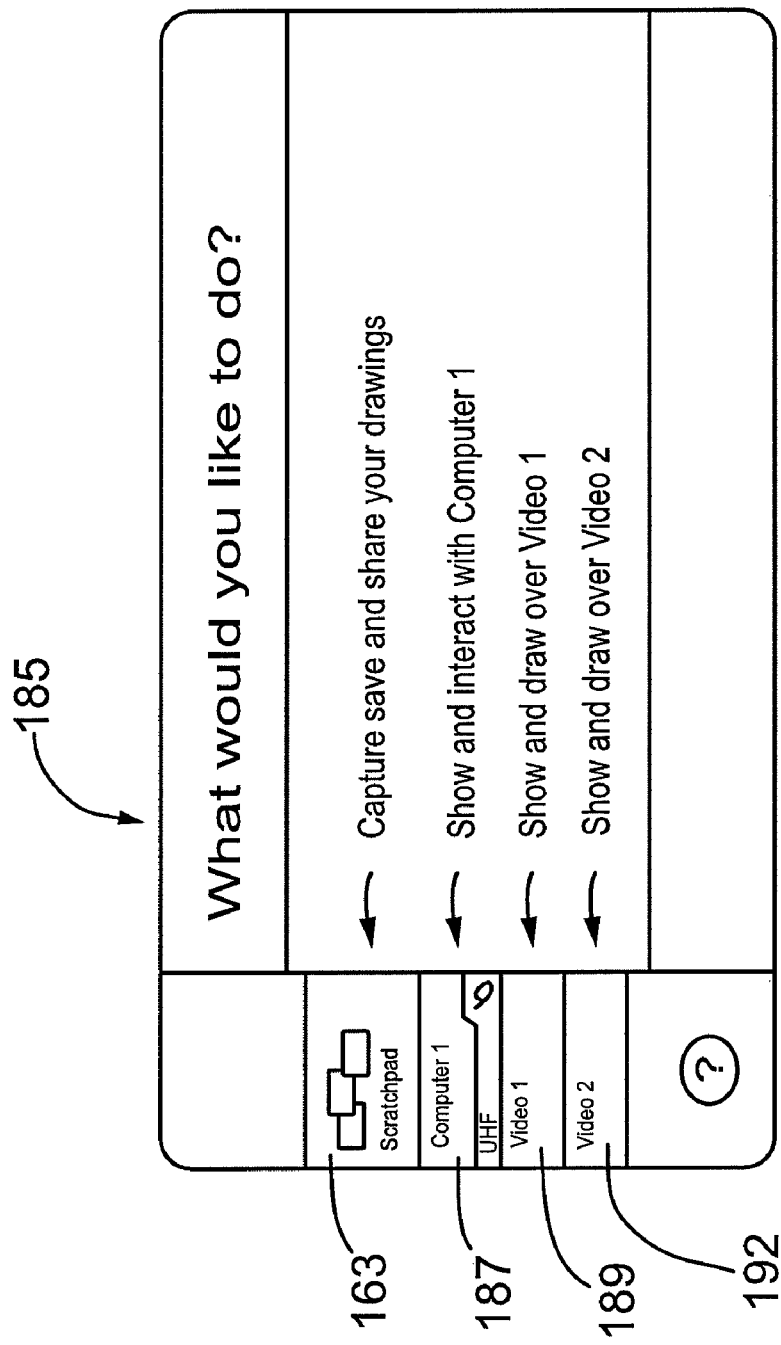
FIG. 10 shows a screen display that is presented to a user upon starting up the touch system.
Figure 11:
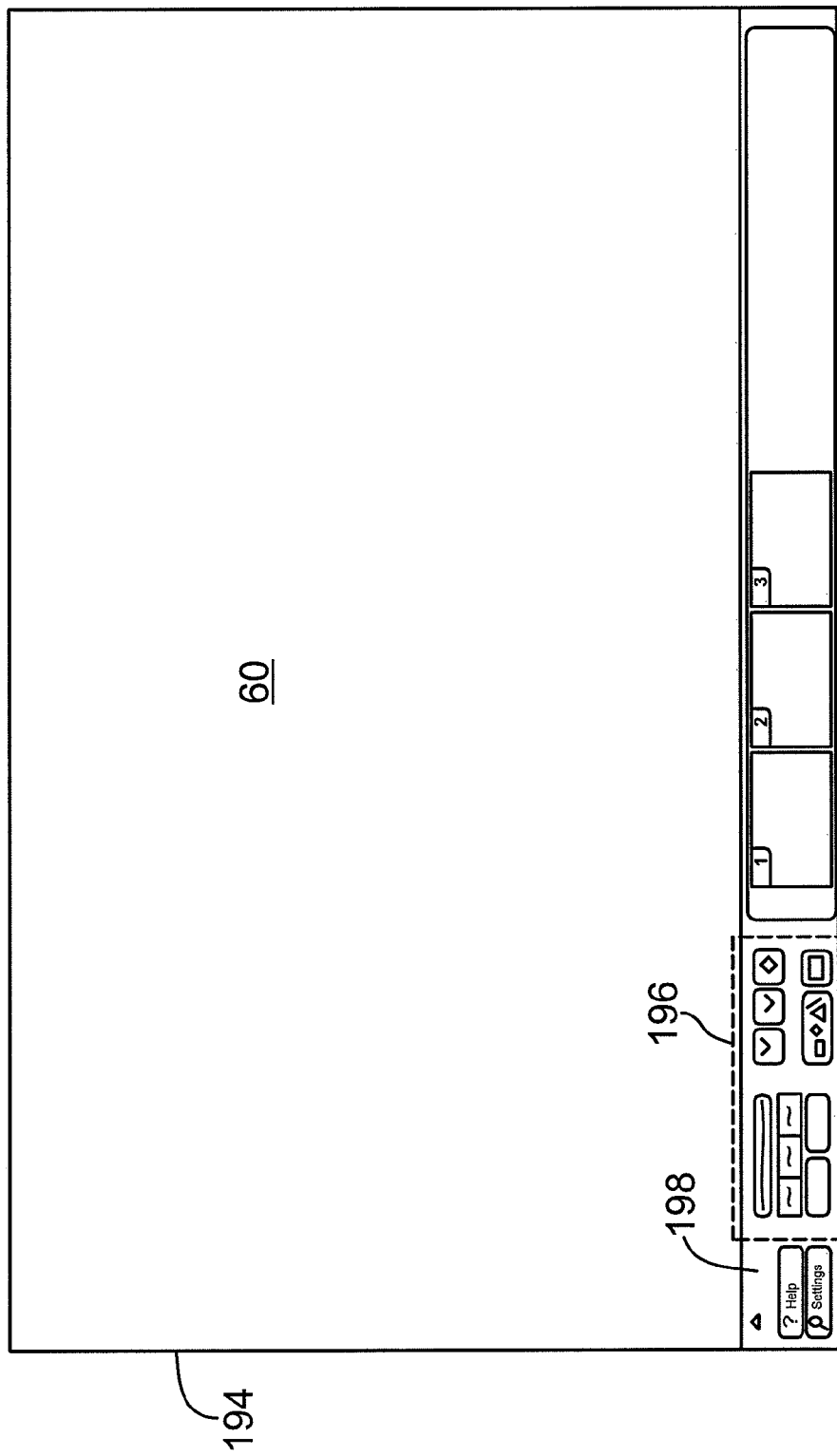
FIGS. 11-13 are examples of screen displays that illustrate a media presentation environment during the selection of various tools.
Figure 12:
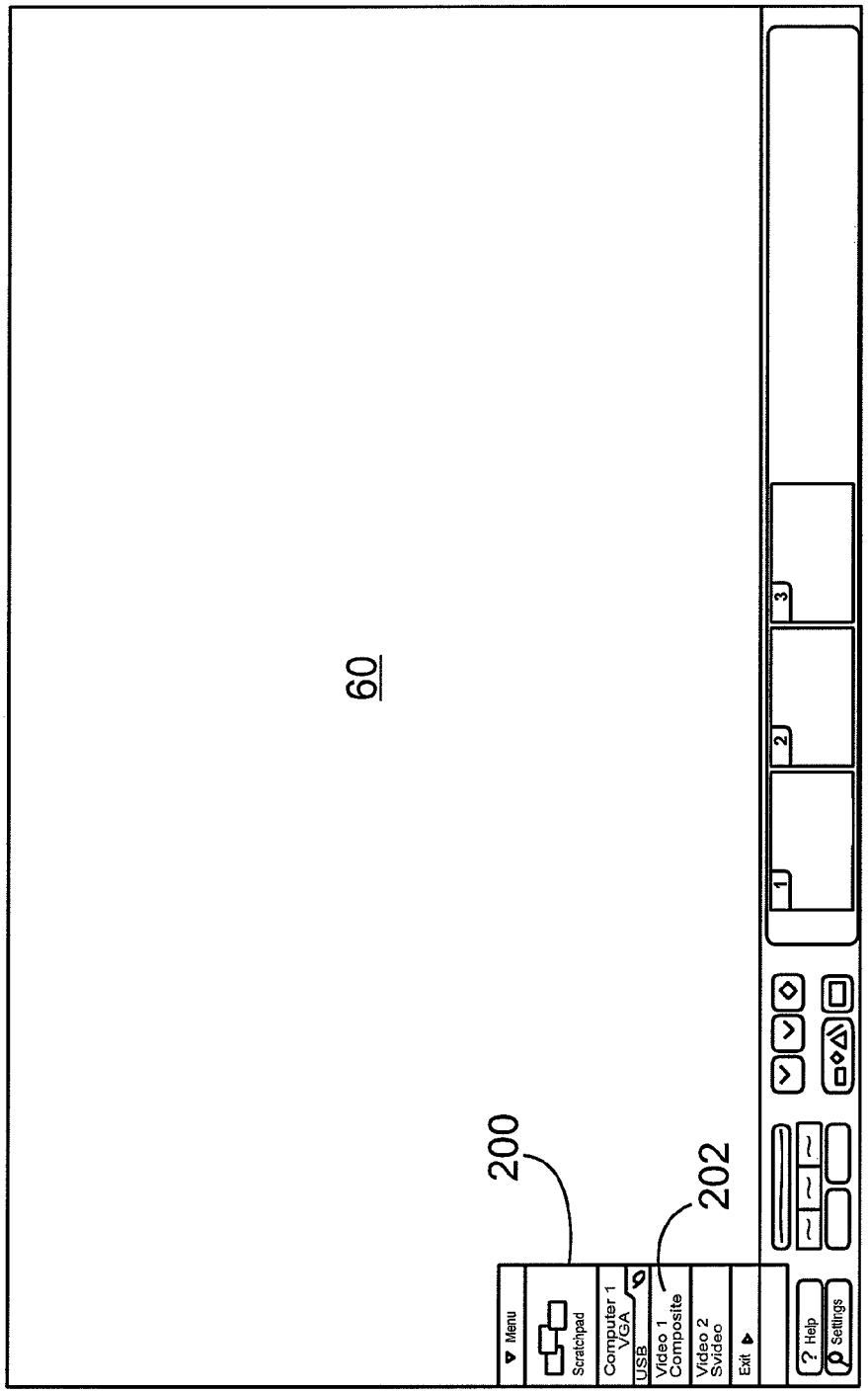
Figure 13:
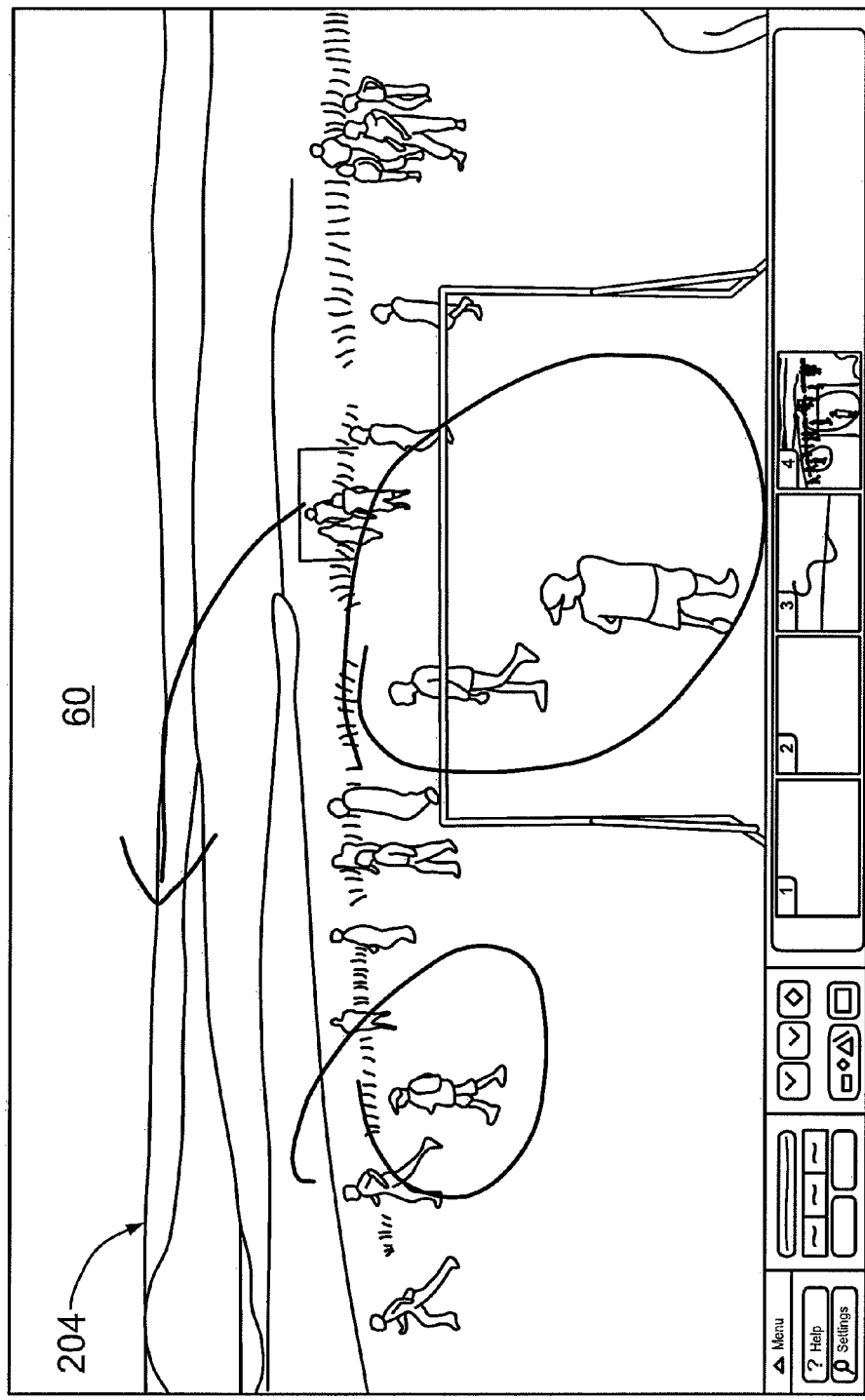
Figure 14:
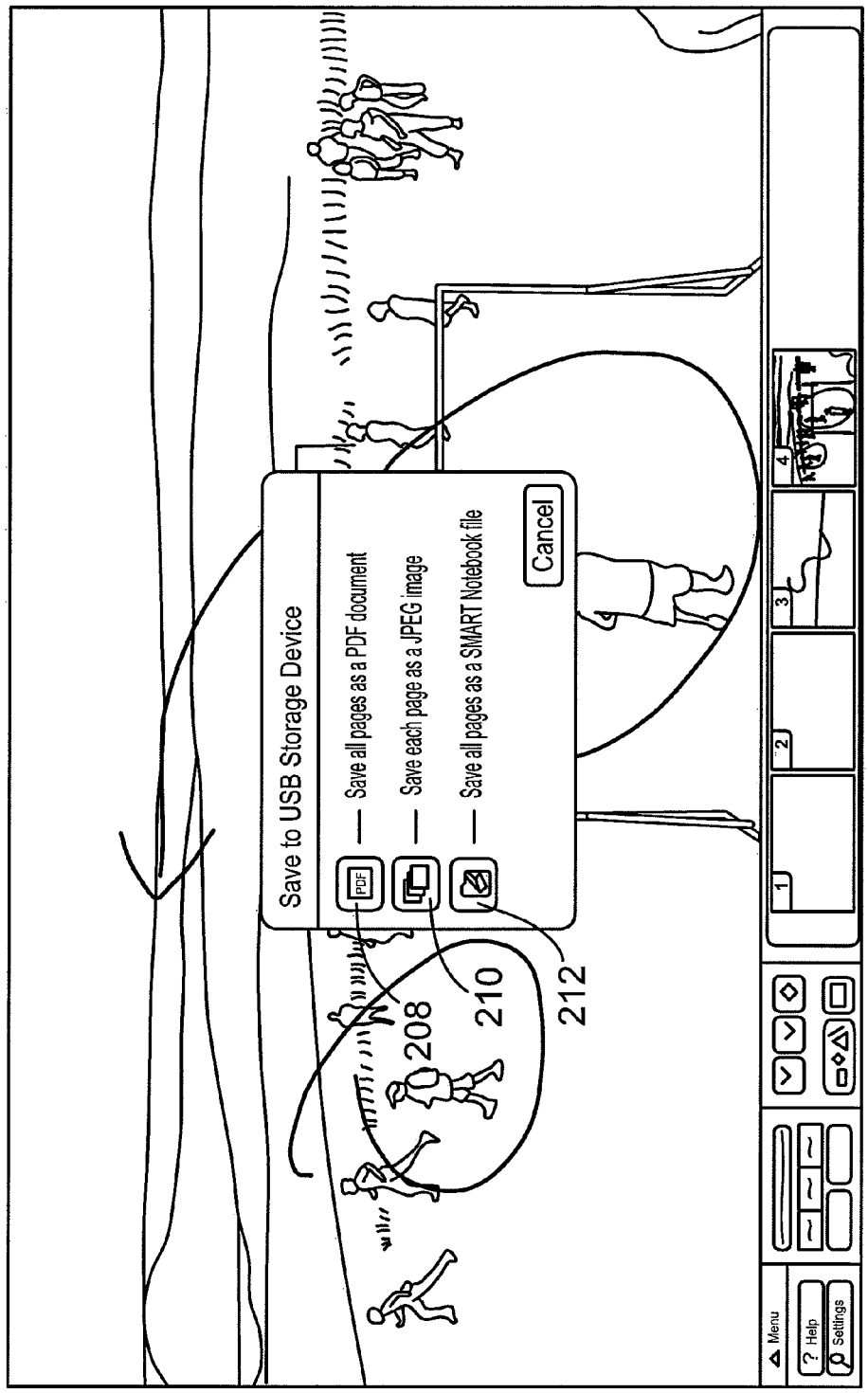
FIG. 14 is an example of screen display that facilitates the saving of a displayed image to a storage device.

Turning now to FIG. 10, when a user first starts-up the touch system 50 (FIG. 1), the user is presented with screen display 185 that gives the user an option to launch image program 163 (ScratchPad), an option to display and interact with the output of media device 187 (Computer 1), an option to display and draw over the output of media device 189 (Video 1), and an option to display and draw over the output of media device 192 (Video 2). When image program 163 is selected, a display screen 194 such as that displayed in FIG. 11 is provided. User accessible tools 196 are also provided. By selecting menu tab 198, a list of selectable media devices 200 are extendably displayed for selection, as depicted in FIG. 12. Once displayed, a media device 202 such as Video 1 is selected for display on touch surface 60. As shown in FIG. 13, images 204 from Video 1 are displayed on touch surface 60, where following an image capture process by image selection tools 160 (FIG. 8), annotation tools 206 may be used to draw over these images 204. Once annotations are added to the captured image 204, it may be saved to, for example, a USB storage device. As shown in FIG. 14, once a user elects to save the image, an option to save as a PDF document 208, an option to save as a JPEG image 210, and an option to save as an alternative file type 212 is provided.

Although one or more exemplary embodiments have been described, those of skill in the art will appreciate that variations and modifications may be made without departing from the spirit and scope thereof as defined by the appended claims.

What is claimed is:

1. A media integration device associated with a touch system including a touch screen, the device comprising:
   a media control module operative to receive media information from a plurality of devices and generate media data associated with each of the plurality of devices, the media control module selecting one device from the plurality of devices for displaying media data associated with the selected one device on the touch screen; and
   a program module operatively coupled to the media control module and adapted to generate a graphical user interface including displaying at least one device control button on the touch screen for operationally controlling the selected one device from the touch screen, and displaying at least one image manipulation button on the touch screen for manipulating an image of the media data, the at least one image manipulation button being dependent upon the selected one device, wherein
   the program module comprises an annotation program operative to add annotations to the image of the media data, and further wherein
   the program module is operative to save the image of the media data with the added annotations to a USB storage device.

2. The device according to claim 1, wherein the program module is operative to provide a user with an option to save the image of the media data on the USB storage device as one of: a PDF document, a JPEG image, an alternative file type.

3. The device according to claim 1, wherein the graphical user interface includes at least one device selection button for selecting one of the plurality of devices as a source of media data for display on the touch screen.

4. The device according to claim 1, further comprising an input interface for receiving and formatting the received media information from the plurality of devices.

5. The device according to claim 4, wherein the input interface device comprises at least one signal processor device.

6. The device according to claim 5, wherein the at least one signal processor device comprises an analog-to-digital converter device.

7. The device according to claim 1, wherein the media information comprises analog or digital video signals.

8. The device according to claim 1, wherein the media information comprises digital image files.

9. The device according to claim 1, wherein the media information comprises audio signals.

10. The device according to claim 8, wherein the digital image files comprise at least one of the group consisting of JPEG files, PDF files, GIF files, TIFF files, BMP files, PNG files, and RAW files.

11. The device according to claim 1, wherein each of the plurality of devices comprises at least two of a VCR player, a DVD player, an MP3 player, a camera, a camcorder, and an image scanner.

12. The device according to claim 1, wherein the at least one device control button comprises at least one activation button.

13. The device according to claim 1, wherein the at least one activation button comprises a play button, a stop button, a pause button, a fast-forward button, and a rewind button.

14. The device according to claim 12, further comprising:
an output interface adapted to receive control data from the media control module based on a user selecting the at least one activation button using the touch screen; and
a transmitter operatively coupled to the output interface and adapted to transmit the received control data to the one device for operatively controlling the one device.

15. The device according to claim 14, wherein the output interface comprises an RS232 interface.

16. The device according to claim 14, wherein the transmitter comprises a remote control device.

17. A method of integrating a plurality of devices associated with a touch system using a touch screen, the method comprising:
coupling media information from a plurality of devices to the touch system;
displaying representations of the plurality of coupled devices on the touch screen;
receiving a selection of one of the plurality of coupled devices using the touch screen;
applying media data associated with the selected one of the plurality of devices to the touch screen;
displaying at least one image manipulation button on the touch screen based on the selected one of the plurality of devices;
manipulating an image of the media data in response to selection of one or more of the at least one displayed image manipulation button;
adding annotations to the image of the media data and saving the image of the media data with the added annotations to a USB storage device.

18. The method according to claim 17, further comprising:
transmitting a control signal corresponding to a selected at least one control button associated with the selected one of the plurality of coupled devices from the touch system to the selected one of the plurality of coupled devices for controlling at least one operation associated with the selected one of the plurality of coupled devices.

19. The method according to claim 18, wherein transmitting the control signal comprises transmitting a wireless signal or a physical transmission medium based signal.

20. The method according to claim 19, wherein transmitting the wireless signal comprises transmitting an infrared signal or RF signal.

21. The method according to claim 19, wherein transmitting the physical transmission medium based signal comprises transmitting data via a cable.

22. The method according to claim 17, wherein displaying the at least one activation button comprises displaying at least one of a play button, a stop button, a pause button, a fast-forward button, and a rewind button.

23. The method according to claim 17, wherein displaying the representation of the plurality of coupled devices comprises displaying at least two of a VCR player, a DVD player, an MP3 player, a camera, a camcorder, and an image scanner.

24. The method according to claim 17, wherein applying the media data comprises displaying image data on the touch screen.

25. The method according to claim 24, wherein displaying the image data comprises displaying at least one of digital image data and digital video data.

26. The method according to claim 17, wherein applying the media data comprises playing audio signals using the touch screen or an external sound system.

27. The method of claim 17, wherein a user is provided with an option to save the image of the media data on the USB storage device as one of: a PDF document, a JPEG image, an alternative file type.

28. An interactive graphical user interface adapted for use within a touch system including a touch screen, the graphical user interface comprising:
a first selectable display region operable to display a plurality of media devices coupled to the touch system, wherein the first selectable display region enables a media device to be selected from the displayed plurality of media devices;
a second selectable display region configurable to display at least one image manipulation tools that corresponds to the media device selected from the displayed plurality of media devices;
wherein the first and second selectable display regions emanate from a common origin on the touch screen, the first selectable region extending in a first direction and the second selectable region extending in a second direction, wherein
the second selectable display region further comprises annotation tools to add annotations to an image of media data from a selected media device and to save the image of the media data with the added annotations to a USB storage device.

29. The user interface according to claim 28, wherein the first and the second direction are substantially orthogonal with respect to one another.

30. The user interface according to claim 28, wherein a user is provided with an option to save the image of the media data on the USB storage device as one of: a PDF document, a JPEG image, an alternative file type.

31. The user interface according to claim 28, wherein the annotation tools comprises at least one of a plurality of:
selectable line drawing buttons each selectable to provide annotations having different line thicknesses; and a line color button operative to change the color of the annotations generated based on activating one of the selectable line drawing buttons.

32. The user interface according to claim 28, further comprising a third selectable display region operable to display a device control tool that using the touch screen is adapted to control operation of at least one of the plurality of media devices selected from the first selectable display region.

33. The user interface according to claim 32, wherein the device control tool comprises at least one of a play button, a stop button, a pause button, rewind button, and a fast-forward button.

34. The user interface according to claim 28, wherein the at least one image manipulation tool includes at least one of an image clear button, an image freeze button, and an image capture button.

35. The user interface according to claim 28, wherein the at least one image manipulation tool includes at least one of brightness and contrast control, cropping, and histogram functions.

36. The user interface according to claim 28, further comprising a settings tool operative to configure the plurality of media devices coupled to the touch system.

37. The user interface according to claim 36, wherein the configured plurality of media devices coupled to the touch system comprise at least two of a VCR player, a DVD player, an MP3 player, a camera, a camcorder, and an image scanner.

38. A method of controlling a plurality of devices associated with a touch system using a touch screen, the method comprising:

displaying a first region on the touch screen that includes a selectable plurality of media devices that are coupled to the touch system; and displaying a second region on the touch screen that includes one or more selectable image manipulation tools corresponding to a media device selected from the displayed plurality of media devices, the second region further comprising one or more selectable annotation tools to add annotations to an image of media data from a selected media device and to save the image of the media data with the added annotations to a USB storage device;

wherein the first and second regions emanate from a common origin on the touch screen, the first region extending in a first direction and the second region extending in a second direction.

39. The method according to claim 38, further comprising generating an image on the touch screen from the media device.

40. The method according to claim 38, further comprising displaying device control tools associated with the selected media device for controlling the selected media device.

41. The method according to claim 40, wherein selection of one or more of the device control tools causes transmission of device control signals to the selected media device.

42. The method of claim 38, wherein a user is provided with an option to save the image of the media data on the USB storage device as one of: a PDF document, a JPEG image, an alternative file type.

\* \* \* \* \*